Nov. 6, 1956
C. W. TITTLE
2,769,916
COINCIDENCE-TYPE SLOW NEUTRON DETECTOR
Filed Oct. 2, 1952
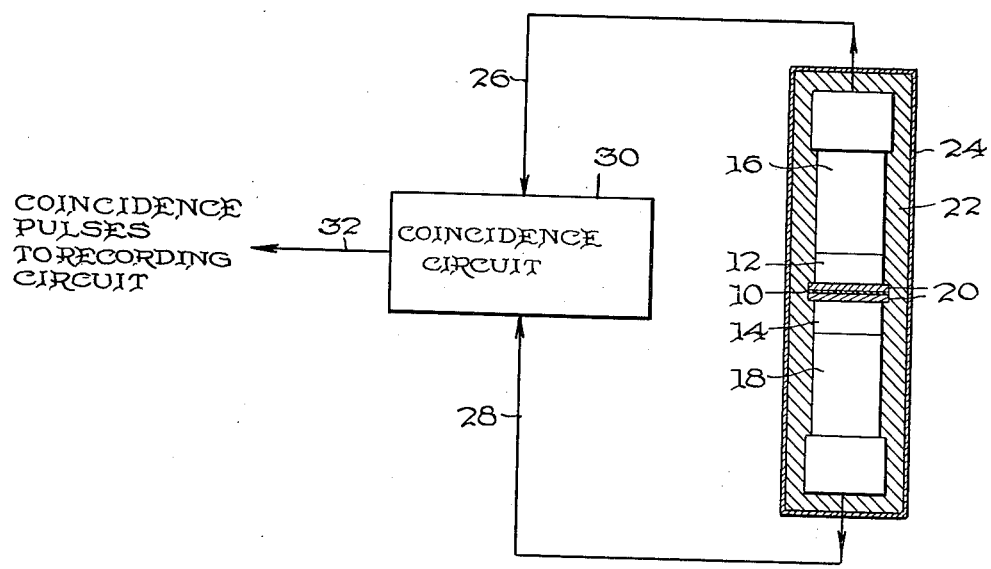
INVENTOR.
CHARLES W. TITTLE
BY
Horace B. Cooke
ATTORNEY United States Patent Office 2,769,916
Patented Nov. 6, 1956

2,769,916
COINCIDENCE-TYPE SLOW NEUTRON DETECTOR

Charles W. Tittle, Oakmont, Pa., assignor to Gulf Research & Development Company, Pittsburgh, Pa., a corporation of Delaware Application October 2, 1952, Serial No. 312,679

8 Claims. (Cl. 250—71.5)

This invention relates to a method of detecting neutrons and to neutron detectors generally, and more particularly pertains to a novel method of epithermal neutron detection and a detector incorporating a coincidence circuit to avoid false counts due to background gamma radiation. This invention relates to subject matter somewhat similar to the disclosure contained in my copending U. S. application Ser. No. 312,680, entitled Epithermal Neutron Detector, filed of even date. This application and said copending application are assigned to a common assignee.

The main objective of the instant invention is to provide a neutron detector of the type that indirectly detects neutrons by detecting gamma-rays produced by the interaction of neutrons with certain atomic nuclei, whereinsuch detector will distinguish between gamma-rays thus produced and background gamma radiation.

Closely allied to the above objective of the invention is the aim to provide such a detector which is sensitive substantially only to neutrons of epithermal energies, that is to neutrons of energies greater than thermal and less than those of neutrons said to be fast.

The over-all desire attained by the present invention is to devise a method and apparatus for producing an electrical pulse solely upon the occurrence of a neutron-caused, gamma-ray-producing event within a defined zone, and to distinguish such events from all other gamma-ray-producing events irrespective of cause.

Briefly, the instant invention comprehends interposing a neutron-gamma reactive material, by which is meant a material including atomic nuclei reactive with incident neutrons to produce gamma-rays by the well known $(n,\gamma)$ reactions, between a pair of gamma-ray-responsive scintillation phosphors, the arrangement being such that a neutron reacting with the interposed material will produce several gamma-rays, two of which may produce simultaneous scintillations or flashes of light in the phosphors. A pair of photomultiplier tubes are arranged on opposite sides of the prosphors so as to receive scintillations from only the phosphor immediately adjacent thereto, whereby either photo-multiplier tube will produce an electrical pulse of very short duration upon a scintillation being produced in the adjacent phosphor. Thus, since the occurrence of a gamma-ray-producing event in the interposed material caused by a neutron will usually result in simultaneous scintillations in the phosphors, a neutron reacting with the interposed material will in a large fraction of the cases cause the photomultiplier tubes to produce simultaneous electrical pulses.

It is upon the basis that neutron-gamma events in the interposed neutron-reactive material will cause the photomultiplier tubes to produce simultaneous pulses that such events are distinguished from other events or conditions that may cause production of electrical pulses by the photomultiplier tubes. Of all events or conditions that may cause one or both of the photomultiplier tubes to produce electrical pulses, other than those caused by the interaction of neutrons with the interposed reactive material, only a very minute proportion thereof will cause the photomultiplier tubes to produce electrical pulses simultaneously or so close in time as to be incapable of resolution by conventional electrical means known as coincidence circuits. Therefore, in the present invention, the pulse output of the photomultiplier tubes is fed to a coincidence circuit, and such circuit produces a signal or passes only such pulses from the photomultiplier tubes which occur within an extremely short interval of time for counting and recording by means commonly used for such purpose.

The invention also encompasses utilizing a neutron-reactive material having a marked tendency to be preferentially reactive with epithermal neutrons, when such detection selectivity is desired, together with an enveloping composite shield that absorbs neutrons of energies less than those to be detected, as well as gamma-rays. By epithermal neutrons is meant neutrons possessing energies ranging from about 0.2 electron volt up to a few hundred electron volts.

Further refinements of the invention include positioning a pair of gamma-ray shields between the phosphors and on opposite sides of the neutron-reactive material, such arrangement being for the purpose of minimizing the effects of gamma-rays of induced radio-activity in the reactive material. These gamma-rays are generally less energetic than the ones due to the $(n,\gamma)$ reaction, and are more readily absorbed. The shields referred to also perform the function of reducing coincidences due to a gamma-ray from an external source being scattered by one phosphor into the other.

Reference is now invited to the accompanying drawing for a full understanding of a preferred embodiment of the invention. Inasmuch as the coincidence circuit per se does not constitute the subject matter of the instant invention, the same has only been indicated diagrammatically in the drawing to show its cooperating relationship with the other parts of the invention, and a similar consideration applies to the photomultiplier tubes.

Indicated at 10 is a neutron-gamma reactive foil-of-metal. A number of elements possess the property of emitting gamma-rays upon reaction of neutrons with the nuclei thereof, and may be suitable for use as the foil-of-metal 10. For example, of neutron-gamma reactive elements, indium, rhodium and gold capture resonance neutrons whose energies lie in the epithermal region, i. e., above thermal equilibrium energies, and thereupon emit capture gamma-rays. In many instances, the element in addition to emitting the practically instantaneous capture gamma-ray also becomes radioactive and emits gamma-rays in its decay over a period of time.

The instant invention is concerned primarily with detecting capture gamma-rays as distinguished from gamma-rays of radio-active decay. One way to achieve practical accomplishment of this purpose is to employ an element such as tantalum since its neutron-induced half-life for gamma-ray emission is long (111 days) so as to be of minor importance relative to capture gamma-ray emission. An element that does not produce gamma-rays in cascade, that is to say, substantially simultaneous emission of two or more gamma-ray photons, during radioactive disintegration, such as gold, may be used for the foil-of-metal 10 for the same purpose.

Disposed on opposite sides of the foil-of-metal 10 is a pair of gamma-ray-responsive scintillation phosphors 12 and 14, and optically coupled to such phosphors are photosensitive elements comprising photomultiplier tubes 16 and 18, respectively, the arrangement being such that a scintillation of either of the phosphors causes actuation of only the photomultiplier tube adjacent thereto to produce an electrical energy pulse. The photomultiplier tubes may be of conventional type, and the phosphors may be of any of the usual gamma-ray responsive types, such as thallium-modified sodium iodide (NaI(Tll)), naphthalene, anthracene, chrysene or stilbene.

Referring again to the desirability of detecting primarily capture gamma-rays, such objective is substantially realized in the preferred form of the invention by the use of thin plates 20 of high atomic weight non-neutron-absorbing gamma-ray shielding material such as lead or bismuth, such plates 20 being disposed between the phosphors 12 and 14 and on opposite sides of the foil-of-metal 10. The purpose of the plates 20 is to permit relatively free passage of the hard capture gamma-rays, while suppressing the relatively soft gamma-rays of induced radioactivity. More specifically, the preferred form of the invention utilizes a foil of rhodium of about three thousandths of an inch in thickness for the foil-of-metal 10, and lead plates of about 2 mm. thickness for the plates 20. Neutrons reacting with rhodium foil 10 cause the latter to emit gamma-rays of radioactivity of 0.041, 0.18 and 0.95 m. e. v., and the lead plates 20 serve to substantially absorb the softer of such rays, and even though the single hard ray is passed to some extent, it will produce an effect in only one of the phosphors and will therefore not be recorded.

The lead plates 20 serve an ancillary function of importance irrespective of the element used for the foil-of-metal 10 in that a gamma-ray originating without the foil 10 and being scattered by one of the phosphors 12 and 14 has less chance of reaching the other phosphor and thereby producing substantially simultaneous scintillations in the two phosphors, inasmuch as the scattered gamma-ray must traverse both plates 20 in order to reach the other phosphor, and therefore has a large probability of being absorbed by the plates, especially so since the scattered gamma-ray has a relatively low energy. The neutron-capture gamma-rays which produce the desirable coincident scintillations are, on the other hand, penetrating enough to pass through the plates 20 in nearly all cases, and so produce a response indicative of a neutron being absorbed by the foil 10.

Notwithstanding the advantages stemming from the provision of plates 20, the use of the same is not essential to satisfactory operation of the invention, particularly where an advantageous selection of an element for the foil-of-metal 10 is made so as to avoid or diminish the undesirable effects of gamma-rays of induced radioactivity, gold and tantalum having already been mentioned as desirable in this respect.

Although not indispensable to satisfactory performance of the invention, by virtue of the coincidence principle involved and the optional use of the lead plates 20, the invention preferably includes a gamma-ray shield 22, which is of a character similar to the plates 20, surrounding the foil-of-metal 10, the phosphors 12 and 14, and the photomultiplier tubes 16 and 18. The purpose of the shield 22 is to reduce further the possibility of extraneous gamma-rays causing simultaneous scintillations in the phosphors 12 and 14.

A thermal-neutron shield 24 surrounds the gamma-ray shield 22 and serves the purpose of excluding neutrons of lower energies than those desired to be detected from the foil-of-metal 10. The material selected for the shield 24 should be of such a character as to be fairly transparent to neutrons of the resonance peak of the element selected for the foil-of-metal 10, while being fairly opaque to neutrons of lesser energy. Such essential relative properties of the shield 24 and the foil-of-metal 10 may be generalized for the purpose of the language of the claims by referring to the foil-of-metal 10 as being a neutron-gamma reactive epithermal-neutron absorber and to the shield 24 as being a thermal-neutron absorber. The foregoing considerations make it apparent that the selection of a suitable material for either the foil-of-metal 10 or the shield 24 will be determined to some extent by the material chosen for the other. In the preferred form of the invention, for example, where a rhodium foil-of-metal 10 is used, the shield 24 is of cadmium of about two hundredths of an inch in thickness, such arrangement conforming to the previously set forth essential relationship inasmuch as cadmium is a very excellent absorber of neutrons of 0.176 e. v. and less energy (such value being a resonance peak), while rhodium has a resonance peak at 1.3 e. v. Cadmium may be used not only with rhodium but with such elements as silver, indium and gold as they all have higher resonance peaks than the cadmium peak of 0.176 e. v. On the other hand, rhodium or indium may be used for shield 24 when the foil-of-metal 10 is gold, since gold has a higher resonance peak than either of the former.

Since the shield 24 will produce gamma-rays on absorbing neutrons, the shield 22 should always be used when the shield 24 is used; however, the shield 22 may be used when shield 24 is not. In the event that shield 24 is dispensed with, the foil-of-metal 10 will then produce gamma-rays by interaction with both epithermal and thermal energies rather than just the former, as will be evident.

The photomultiplier tubes 16 and 18 are appropriately connected through electric conduits 26 and 28, respectively, to a conventional coincidence circuit, which may include amplifiers, etc., labeled and indicated at 30 in the drawing. Such circuits are known and are disclosed for example at page 44 of "Radioactivity and Nuclear Physics" by Cork (Van Nostrand 1947), and in U. S. Patent No. 2,517,404 (Morton), issued August 1, 1950.

The arrangement is such that a pulse of electrical energy will pass through the coincidence circuit output conduit 32 to usual apparatus, not shown, customarily associated with detectors, such as a rate meter, scaling and counting circuit, recorders, etc., solely upon the occurrence of the coincidence circuit 30 reeiving substantially simultaneous electrical pulses from the photomultiplier tubes 16 and 18 through the conduits 26 and 28. Thus, a gamma-ray-producing event in the foil-of-metal 10 will in many cases cause simultaneous pulses in the conduits 26 and 28 to result in a pulse in the output conduit 32, provided the gamma-ray is sufficiently hard to pass adequate energy through the plates 20 for photomultiplier tube actuation, while gamma-rays originating elsewhere will, in all probability, not cause simultaneous pulses in the conduits 26 and 28, and therefore not result in a pulse in the output conduit 32. It is possible for a neutron to be absorbed by the foil-of-metal 10 without causing simultaneous pulses to appear in conduits 26 and 28, by virtue of the fact that the phosphors 12 and 14 are not 100 percent efficient, but this effect merely reduces the over-all efficiency of the detector for neutrons.

Summarizing the operation of the invention, an epithermal neutron will pass substantially freely through the thermal-neutron shield 24, the gamma-ray shield 22 and then react with the foil-of-metal 10 to produce gamma-rays that cause simultaneous scintillations in the phosphors 12 and 14, such scintillations being detected by the photomultiplier tubes 26 and 28, with such tubes feeding simultaneous pulses to the coincidence circuit 30 to result in an output pulse in the conduit 32. Fast neutrons pass through the apparatus substantially unhindered and do not produce appreciable gamma-rays in the foil-of-metal 10. With the use of the thermal-neutron shield 24, thermal neutrons do not reach the foil-of-metal 10, and the phosphors 12 and 14 are shielded from gamma-rays produced by thermal neutrons in the thermal neutron shield 24 by the gamma-ray shield. If it is desired also to detect thermal neutrons in addition to epithermal neutrons, the shield 24 may be dispensed with.

The use of the shielding plates 20 is optional, but is recommended where the element employed for the foil-of-metal 10 produces a gamma-ray cascade in its induced radioactive decay, as the plates 20 serve to shield the phosphors 12 and 14 from the softer gamma-ray emissions.

What I claim is:

1. In a neutron detecting apparatus, a neutron-gamma reactive substance, a pair of gamma-ray-responsive scintillation phosphors disposed on opposite sides of said substance, material opaque to scintillations disposed between the phosphors, a pair of photomultiplier tubes optically coupled individually to said pair of phosphors, and a coincidence circuit coupled to the outputs of said photomultiplier tubes.

2. In a neutron detecting apparatus, a neutron-gamma reactive substance, a pair of gamma-ray-responsive scintillation phosphors disposed on opposite sides of said substance, a pair of equally thick gamma-ray shields disposed between the phosphors and on opposite sides of said substance, a pair of photomultiplier tubes optically coupled individually to said pair of phosphors, gamma-ray shielding material surrounding all the above-mentioned items as an entity, and a coincidence circuit coupled to the outputs of said photomultiplier tubes.

3. In an epithermal-neutron detecting apparatus, a neutron-gamma reactive substance having an epithermal neutron resonance peak, a pair of gamma-ray-responsive scintillation phosphors disposed on opposite sides of said substance, a pair of photomultiplier tubes optically coupled individually to said pair of phosphors, gamma-ray shielding material surrounding all the above mentioned items as an entity, a thermal neutron shield surrounding said gamma ray shielding material, and a coincidence circuit coupled to the outputs of said photomultiplier tubes.

4. In an epithermal-neutron detecting apparatus, a neutron-gamma reactive substance having an epithermal neutron resonance peak, a pair of gamma-ray-responsive scintillation phosphors disposed on opposite sides of said substance, a pair of equally thick gamma-ray shields disposed between the phosphors and on opposite sides of said reactive substance, a pair of photomultiplier tubes optically coupled individually to said pair of phosphors, gamma-ray shielding material surrounding all the above mentioned items as an entity, a thermal neutron shield surrounding said gamma ray shielding material, and a coincidence circuit coupled to the outputs of said photomultiplier tubes.

5. In a neutron detecting apparatus, a neutron-gamma reactive substance, a pair of gamma-ray-responsive scintillation phosphors disposed on opposite sides of said substance, a pair of photomultiplier tubes optically coupled individually to said pair of phosphors, gamma-ray shielding material surrounding all the above mentioned items as an entity and a coincidence circuit coupled to the outputs of said photomultiplier tubes.

6. In a neutron detecting apparatus, a neutron-gamma reactive substance, a pair of gamma-ray-responsive scintillation phosphors disposed on opposite sides of said substance, a pair of equally thick gamma-ray shields disposed between the phosphors and on opposite sides of said substance, and a pair of photosensitive elements optically coupled individually to said pair of phosphors and adapted to be electrically coupled to a coincidence-type electrical circuit.

7. A method of producing an output electrical energy pulse upon the presence of a neutron in a zone disposed between two gamma-ray detecting zones comprising the steps of causing the neutron to undergo a neutron-capture reaction in the first-mentioned zone, effecting an electrical energy pulse upon the passage of a gamma-ray in either of said detecting zones, and producing said output electrical energy pulse upon substantial simultaneity of a pair of pulses effected with respect to both of the detecting zones according to the preceding step.

8. The method of claim 7, including the step of attenuating gamma-rays passing from one to the other of the detecting zones.

References Cited in the file of this patent

UNITED STATES PATENTS

| | | |
|---|---|---|
| 2,206,634 | Fermi et al. | July 2, 1940 |
| 2,274,900 | Kallmann | Mar. 3, 1942 |
| 2,508,772 | Pontecorvo | May 23, 1950 |
| 2,550,106 | Coltman et al. | Apr. 24, 1951 |
| 2,556,768 | McKibben | June 12, 1951 |
| 2,681,416 | Thompson | June 15, 1954 |

OTHER REFERENCES

Physical Review (vol. 51), June 1, 1937, pp. 897–898.

Solid Counters, etc., Wouters; AECD 2203. Published by AEC, Oak Ridge, Tenn., Aug. 5, 1948, pp. 1–9.

A Coincidence Scintillation Counter, Morton et al., Nucleonics, February 1949, pp. 25–29.

Radioactivity and Nuclear Physics, Cork, 2nd edition. Published by Van Nostrand Co., Inc., New York, N. Y., 1950, p. 121.

The Review of Scientific Instruments, March 1953, (article received by the Journal Dec. 6, 1951), vol. 24, #3, pp. 193–195.